(12) United States Patent
Winternitz et al.

(10) Patent No.: US 8,365,129 B2
(45) Date of Patent: Jan. 29, 2013

(54) EDGE ROUTING USING CONNECTION REGIONS

(75) Inventors: Fabian Omar Winternitz, Sammamish, WA (US); Kael R. Rowan, Kenmore, WA (US); Timothy Garry Dwyer, Seattle, WA (US); Stuart John Harding Kent, Canterbury (GB); Lev Borisovich Nachmanson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 12/631,102

(22) Filed: Dec. 4, 2009

(65) Prior Publication Data
US 2011/0134926 A1 Jun. 9, 2011

(51) Int. Cl.
*G06F 17/50* (2006.01)
(52) U.S. Cl. ......................................................... 716/126
(58) Field of Classification Search .................. 716/100, 716/126
See application file for complete search history.

(56) References Cited

U.S. PATENT DOCUMENTS

| | | | | |
|---|---|---|---|---|
| 6,678,876 B2 * | 1/2004 | Stevens et al. | ............... | 716/126 |
| 7,111,268 B1 * | 9/2006 | Anderson et al. | ............ | 716/113 |
| 7,506,289 B1 * | 3/2009 | Chapman | ...................... | 716/126 |
| 7,793,249 B1 * | 9/2010 | Wadland et al. | .............. | 716/129 |
| 7,814,453 B2 * | 10/2010 | Stevens et al. | ................ | 716/126 |
| 2001/0009031 A1 * | 7/2001 | Nitta et al. | ...................... | 716/13 |
| 2003/0070153 A1 * | 4/2003 | Stevens et al. | .................. | 716/12 |
| 2004/0088670 A1 * | 5/2004 | Stevens et al. | .................. | 716/13 |
| 2005/0151258 A1 * | 7/2005 | Kotecha et al. | ............... | 257/758 |
| 2005/0273746 A1 | 12/2005 | Malhotra | | |
| 2007/0028201 A1 * | 2/2007 | Mehrotra et al. | ............... | 716/12 |
| 2007/0220522 A1 * | 9/2007 | Coene et al. | .................. | 718/104 |
| 2008/0155061 A1 | 6/2008 | Afergan | | |

OTHER PUBLICATIONS

Sartipi et al.—A Graph Pattern Matching Approach to Software Architecture Recovery—Published Date: 2001 http://www.cas.mcmaster.ca/~sartipi/papers/icsm01.pdf (Copy Attached).
Author Unknown—Diagram Edges 1.0 Requirements Specification—Published Date: 2002 http://software.topcoder.com/catalog/document?id=24670944 (Copy Attached).
Holten—Force-Directed Edge Bundling for Graph Visualization—Published Date: 2009 http://www.win.tue.nl/~dholten/papers/forcebundles_eurovis.pdf (Copy Attached).

(Continued)

*Primary Examiner* — Suchin Parihar
(74) *Attorney, Agent, or Firm* — Workman Nydegger

(57) ABSTRACT

A computer system identifies a source node that is to be connected to a target node, where the target node is connected to the source node using an edge that links a connection region associated with the source node to a candidate connection region of the target node. The computer system identifies candidate connection region constraints that place restrictions on where the candidate connection regions can be positioned on the target node and determines, based on the identified candidate connection region constraints, the position of each candidate connection region relative to the target node. At least two of the candidate connection regions are disconnected so that an edge's connection to the target node can change between the disconnected connection regions. The computer system also visually represents the position of each of the candidate connection regions of the target node.

20 Claims, 5 Drawing Sheets

OTHER PUBLICATIONS

Dwyer—Exploration of Networks Using Overview+Detail with Constraint-Based Cooperative Layout—Published Date: Oct. 19, 2008; http://www.csse.monash.edu.au/~mwybrow/papers/dwyer-infovis-2008.pdf (Copy Attached).

Tilley et al.—5th International Workshop on Graphical Documentation: Determining the Barriers to Adoption of UML Diagrams—Published Date: Sep. 21-23, 2005, http://delivery.acm.org/10.1145/1090000/1085317/p4-tilley.pdf?key1=1085317&key2=8014306521&coll=GUIDE&dl=GUIDE&CFID=57367330&CFTOKEN=89417220 (Copy Attached).

Lai—Layout Adjustment and Boundary Detection for a Diagram—Published Date: 2001 http://ieeexplore.ieee.org/stamp/stamp.jsp?arnumber=00934697 (Copy Attached).

Dwyer, et al.—Fast Edge-Routing for Large Graphs—Published Date: 2009—http://research.microsoft.com/pubs/81239/routing.pdf (Copy Attached).

Nöllenburg—"An Improved Algorithm for the Metro-Line Crossing Minimization Problem"—2009—(Copy Attached).

* cited by examiner

EDGE ROUTING USING CONNECTION REGIONS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to display diagrams, charts and other types of data presentations. Such software typically displays various nodes with lines or, more formally, "edges" connecting the nodes. The nodes may represent different diagram elements and the connecting edges may represent a link between the nodes. In some cases, when designing such a chart or diagram, a user may want to make changes to the positioning of the nodes and/or the edges linking the nodes. These position changes affect not only the moved nodes but also those nodes whose edges lie in the path of the newly moved node.

BRIEF SUMMARY

Embodiments described herein are directed to establishing one or more possible connection regions for connecting an edge to a node. In one embodiment, a computer system identifies a source node that is to be connected to a target node, where the target node is connected to the source node using an edge that links a connection region associated with the source node to a candidate connection region of the target node. The candidate connection region comprises a bounded area in which the edge connects to the target node. The computer system identifies candidate connection region constraints that place restrictions on where the candidate connection regions can be positioned on the target node and determines, based on the identified candidate connection region constraints, the position of each candidate connection region relative to the target node. At least two of the candidate connection regions are disconnected so that an edge's connection to the target node can change between the disconnected connection regions. The computer system may also visually represent the position of each of the candidate connection regions of the target node.

In another embodiment, a computer system defines candidate connection regions for a source node and for a target node, where the source node is to be linked to the target node using an edge, and where the source node and target node are both nodes in a node-link diagram. The computer system determines the optimal route between the source node and the target node based on at least one of the following factors: the number of edges crossing, the shortest path between the nodes and the least number of bends in the edge. The computer system also routes the edge from the source node to the target node using the determined optimal route.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
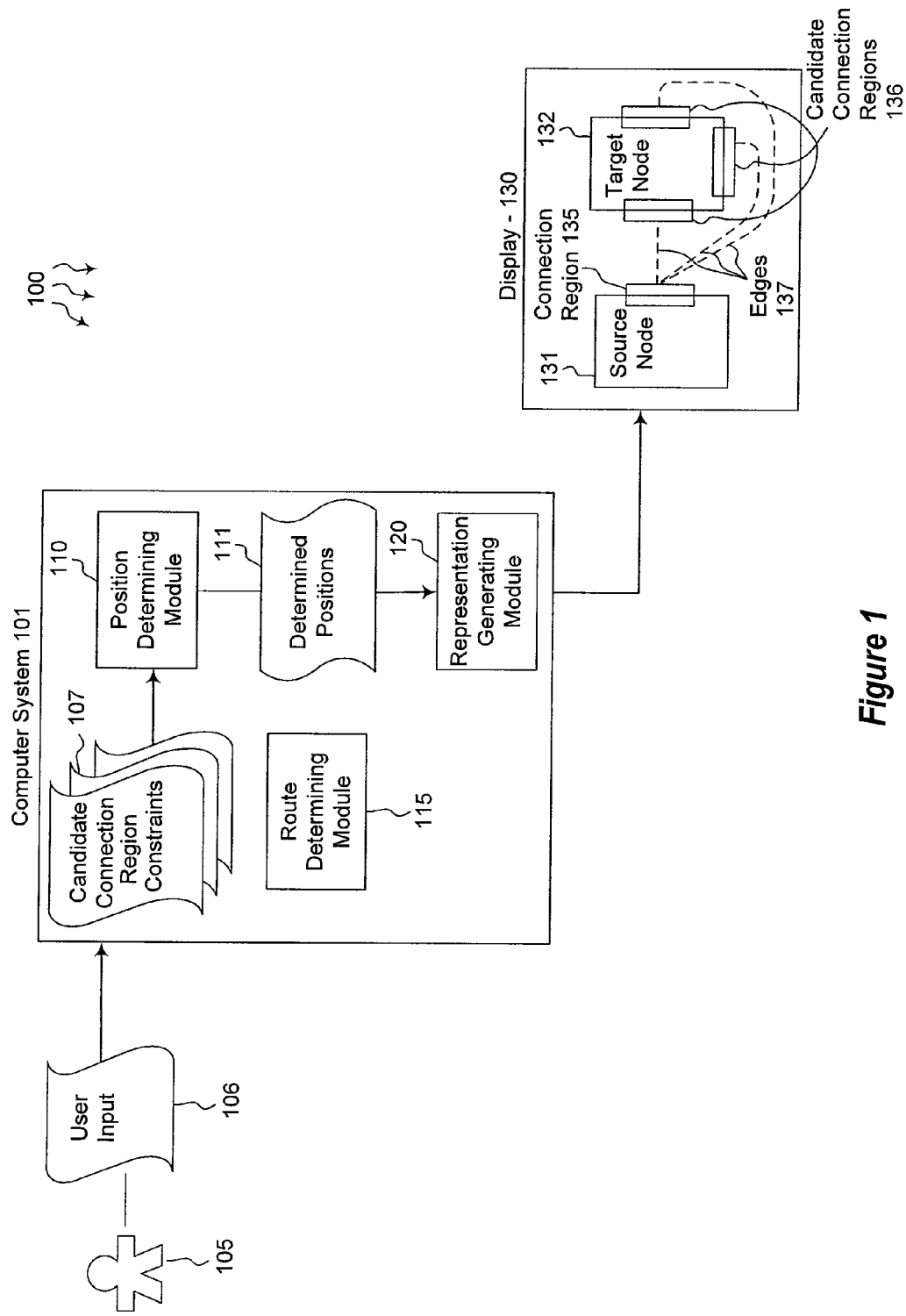
FIG. 1 illustrates a computer architecture in which embodiments of the present invention may operate including establishing one or more possible connection regions for connecting an edge to a node.

Embodiments described herein are directed to establishing one or more possible connection regions for connecting an edge to a node. In one embodiment, a computer system identifies a source node that is to be connected to a target node, where the target node is connected to the source node using an edge that links a connection region associated with the source node to a candidate connection region of the target node. The candidate connection region comprises a bounded area in which the edge connects to the target node. The computer system identifies candidate connection region constraints that place restrictions on where the candidate connection regions can be positioned on the target node and determines, based on the identified candidate connection region constraints, the position of each candidate connection region relative to the target node. At least two of the candidate connection regions are disconnected so that an edge's connection to the target node can change between the disconnected connection regions. The computer system also visually represents the position of each of the candidate connection regions of the target node.

In another embodiment, a computer system defines candidate connection regions for a source node and for a target node, where the source node is to be linked to the target node using an edge, and where the source node and target node are both nodes in a node-link diagram. The computer system determines the optimal route between the source node and the target node based on at least one of the following factors: the number of edges crossing, the shortest path between the nodes and the least number of bends in the edge. The computer system also routes the edge from the source node to the target node using the determined optimal route.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes computer system 101. Computer system 101 may include any type of computer system including a desktop, laptop, server, mobile or other computing device. Computer system 101 may be configured to receive input from a user. For instance computer system 101 may receive user input 106 from computer user 105. This input may then be used to produce an output displayable on display 130. As with computer system 101, display 130 may be any type of computer monitor, screen or other type of display.

In some cases, computer system 101 may be used to determine where various display elements should be placed in a diagram. For instance, in a node-link diagram, nodes are typically linked to each other using a line or edge. The placement of the nodes and/or the edge may be determined by the user or the computer system. In such diagrams, a user is often able to move (e.g. click and drag) a node around on the display window. For example, user 105 may be able to click and drag source node 131 or target node 132 within the display window 130. Node 131 is labeled a "source" node as it is the originating source of the connection between it and the target node 132. It should be noted that the terms line, link and edge, as used herein, generally refer to the visual connections between nodes, and may be used interchangeably throughout.

In some embodiments, connection regions may be used as physical areas to which a line or edge may be connected. For instance, instead of having a fixed point where an edge connects to source node 131, the edge may be connected to node 131 anywhere within the connection region 135. This allows more flexibility when affixing an edge to a node. For example, in cases where multiple edges are connecting to a single connection region, the location in which each edge connects to the node may be optimized, taking into account all the other incoming or outgoing edges. Optimizing the connection location may include determining which available connection location results in the shortest edges, the least number of edge crossings, the least number of bends in the edge and any other factor that would improve or optimize the aesthetic or functional appeal of the connecting edge.

Each node may have zero or more connection regions. As shown in FIG. 1, source node 131 has one connection region 135, while target node 132 has three connection regions 136. Before the edge has been drawn between the source and target nodes, each of the connection regions 136 are viable candidates for accepting the connection. Thus, whenever multiple connection regions are available, they may be referred to as candidate connection regions. As will be explained in greater detail below, each candidate connection region may be disconnected from the others. That is, each candidate connection region may be used independently of the other connection regions, depending on which is optimal for a given situation.

Proper placement of these candidate connection regions may be determined by computer system 101. Additionally or alternatively, the placement of candidate connection regions may be determined by a computer user. In some cases, various constraints may exist that limit where a connection region may be placed on a node. Other constraints may limit the size, number or alignment of connection regions for a given node or node graph. Thus, position determining module 110 of computer system 101 may access candidate connection region constraints 107 to determine the placement positions for each of the candidate connection regions for a given node. Using these determined positions 111, representation generating module 120 may generate a visual representation of the nodes and the nodes' candidate connection regions. Representation generating module 120 may also be configured to output a visual representation of the edge(s) 137 between the connection region of the source node and one of the candidate connection regions of the target node, as determined by route determining module 115. Route determining will be explained in greater detail below with regard to method 200 and 300 of FIGS. 2 and 3, respectively.

Figure 2:
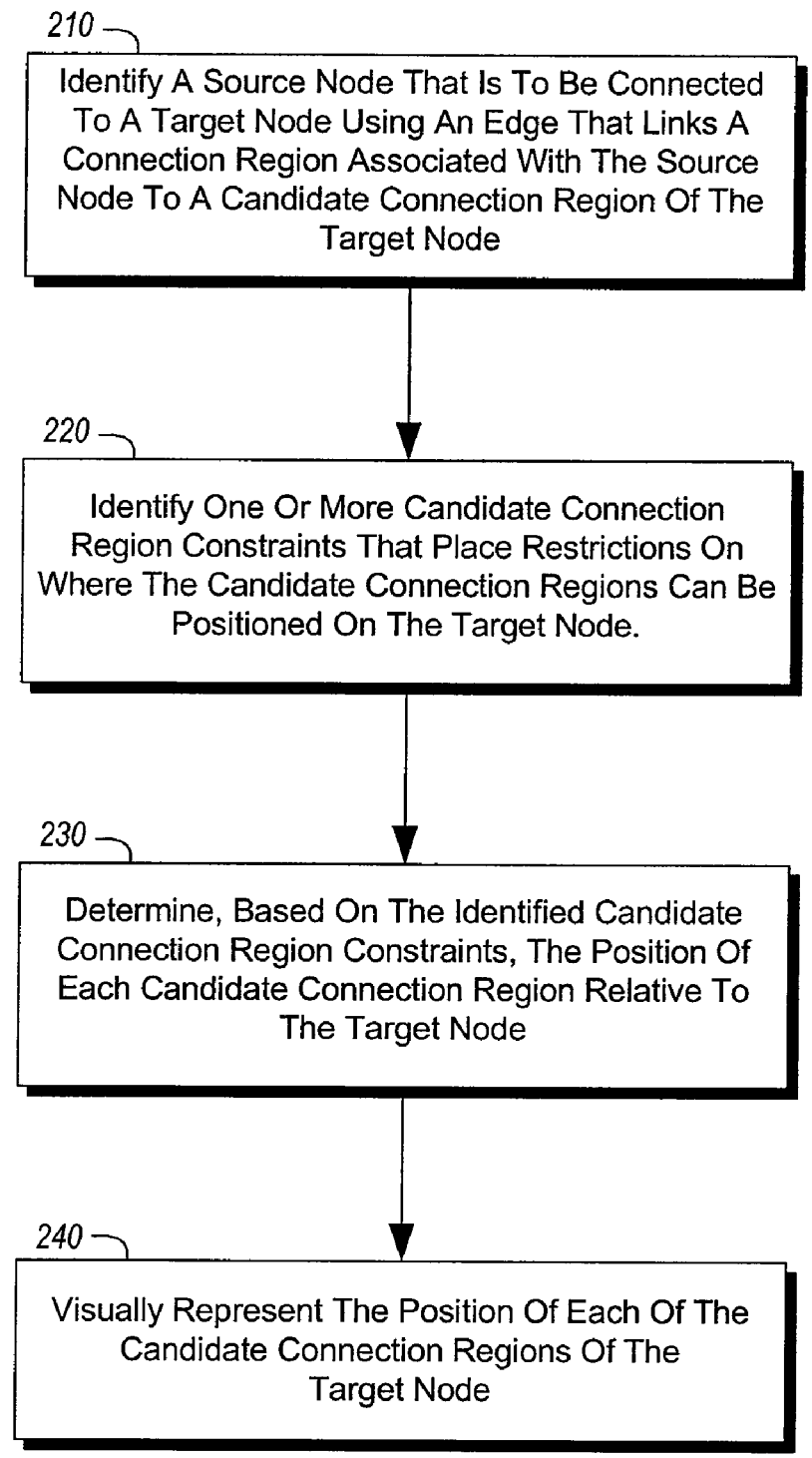
FIG. 2 illustrates a flowchart of an example method for establishing one or more possible connection regions for connecting an edge to a node.

FIG. 2 illustrates a flowchart of a method 200 for establishing one or more possible connection regions for connecting an edge to a node. The method 200 will now be described with frequent reference to the components and data of environment 100.

Method 200 includes an act of identifying a source node that is to be connected to a target node, wherein the target node is connected to the source node using an edge that links a connection region associated with the source node to a candidate connection region of the target node, the candidate connection region comprising a bounded area in which the edge connects to the target node (act 210). For example, computer system 101 may identify source node 131 that is to be connected to target node 132 using edge 137 that links connection region 135 of the source node to one of the candidate connection regions 136 of the target node.

In some cases, nodes 131 and 132 may be two nodes of a much larger node-link diagram that comprises a plurality of different nodes and links. It should also be noted that while edges 137 points to multiple different potential edges (depending on which candidate connection region is chosen), typically only one edge will be drawn between the two selected connection regions of the source and target nodes, respectively. However, in some cases, multiple edges may be drawn between the source node and the target node, and each edge may follow the same or different paths between nodes. Still further, the source and target nodes may comprise database tables with entity relationships between the database tables. Accordingly, in such cases, choosing which candidate connection region to use may be based on the entities' relationships with each other. Such relationships may also be viewed as constraints, as will be explained with regard to act 220.

Method 200 includes an act of identifying one or more candidate connection region constraints that place restrictions on where the candidate connection regions can be positioned on the target node (act 220). For example, computer system 101 may access candidate connection region constraints 107 to identify one or more constraints that place restrictions on where the candidate connection regions 136 can be positioned on the target node 132. Such constraints may place various limitations on connection region positioning, size, alignment, number of regions per node, number of regions per node graph, number per node-link diagram, or any other type of limitation.

In some cases, the constraints for the candidate connection regions may be based on the content type of the target node. For instance, the content type of target node 132 may dictate that it can only have one candidate connection region and that the region is only to be placed at the bottom portion of the node. Of course, this is only one example of the many different types and combinations of constraints that may be used within computer system 101. For instance, computer system 101 may determine an appropriate candidate connection region for a node that includes an inheritance edge as well as for a node of an object-oriented design diagram, so that the two are linked at the determined candidate connection regions. In another example, constraints 107 may be defined by a style associated with the software application implementing the nodes. Accordingly, in this example, a software application configured for designing and manipulating node-link diagrams may implement a style for the diagrams which may include one or more constraints on the candidate connection regions of the diagram's nodes.

Method 200 includes an act of determining, based on the identified candidate connection region constraints, the position of each candidate connection region relative to the target node, wherein at least two of the candidate connection regions are disconnected such that an edge's connection to the target node can change between the disconnected connection regions (act 230). For example, position determining module 110 may determine, based on the identified candidate connection region constraints 107, the position 111 of each candidate connection region 136 of target node 132. In some embodiments, at least two of the candidate connection regions are disconnected, allowing an edge's connection to the target node to change from one connection region to another connection region. Accordingly, if computer system 101 determines that it would be better for the edge to be connected to a different connection region (for example, because the user has moved the source node to a different position), the edge's connection can be switched to a different connection region.

Method 200 includes an act of visually representing the position of each of the candidate connection regions of the target node (act 240). For example, representation generating module 120 may generate a visual representation of the position of each candidate connection region 136 for target node 132. In the example illustrated in FIG. 1, source node has only one connection region, and thus no candidate connection regions. It should be noted, however, that a source node or any other node may have any number of candidate connection regions.

In some cases, multiple different edges may be connected to a single connection region. These edges may be spread out within the connection region according to a user-defined or other system-defined spacing. Such system-defined spacing may include minimum spacing, maximum spacing and ideal spacing. The spreading may occur, for example, when multiple different nodes are connected to a single connection region. The actual connection points may be spaced out over the connection region according to a predefined spacing pattern or according to a user-defined spacing pattern. In some cases, it may be desirable to have the actual connection points tight together or more loosely spaced out. Thus, the spacing can be customized by the user and/or the software developer.

In some cases, in a node-link diagram where multiple nodes and edges exist, two or more edges may be combined at the same connection region. This may occur upon determining that, as a result of a user input (e.g. clicking and dragging a node), the best candidate connection region is the same region for both edges. In some cases, a determination as to which candidate connection region is the best to connect to for a given node may be made for each node in real-time. Thus, as will be explained in greater detail below, a user may click and drag a node or collection of nodes (e.g. in a node graph) and, while the node/collection of nodes is being dragged, the computer system may automatically determine, in real-time, which candidate connection region would be optimal for connecting the nodes.

Determining which candidate connection region is the optimal or best connection region for a given edge may be determined based on at least one of the following factors: the number of edges crossing, the shortest path between the nodes and the least number of bends in the edge. These factors may be viewed as aesthetic factors in that decreasing crossed lines, decreasing the line length and decreasing the number of line bends all lead to a more aesthetically pleasing diagram. Using these factors, and in conjunction with any applicable constraints, computer system 101 may determine, in real-time, which candidate connection region is best and dynamically change the connection point to another connection region if it determines that the other connection region would result in a better (i.e. more aesthetically pleasing) diagram.

Because of this real-time candidate connection region selection determination, computer system 101 may receive input 106 from user 105 indicating that a node is to be moved within a node-link diagram and continually update the edge routing for each node as the user moves the node. Node routing will now be explained in greater detail below with regard to method 300 of FIG. 3 and environment 400 of FIG. 4.

Figure 3:
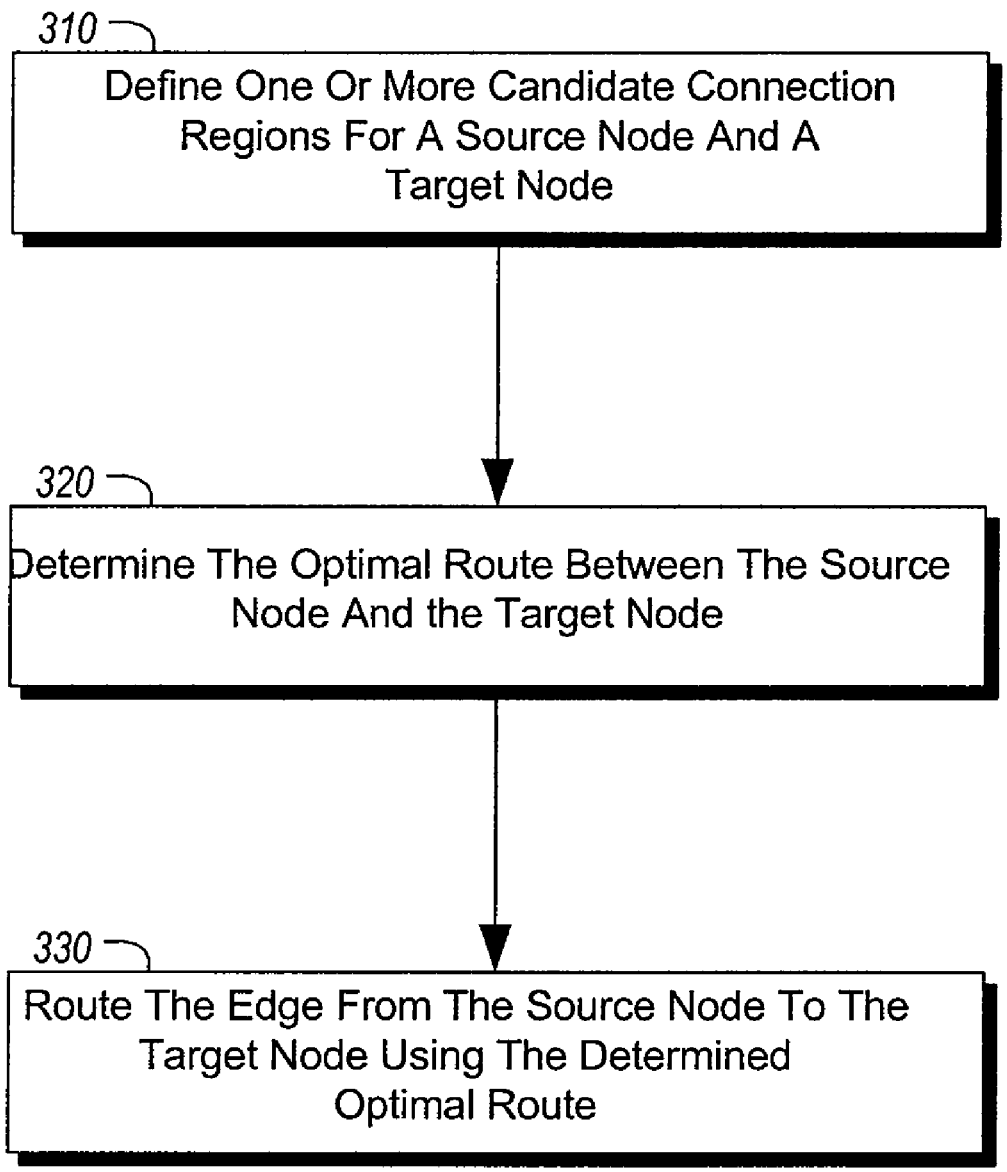
FIG. 3 illustrates a flowchart of an example method for determining an optimal routing path between a source node and a target node.

FIG. 3 illustrates a flowchart of a method 300 for determining an optimal routing path between a source node and a target node. The method 300 will now be described with frequent reference to the components and data of environment 100.

Method 300 includes an act of defining one or more candidate connection regions for a source node and for a target node, wherein the source node is to be linked to the target node using an edge, and wherein the source node and target node are both nodes in a node-link diagram (act 310). For example, position determining module 110 may define one or more candidate connection regions for source node 131 and target node 132, where node 131 is to be linked to node 132 using an edge 137 and where nodes 131 and 132 are both nodes in a node-link diagram. As mentioned above, nodes 131 and 132 can have any number of candidate connection regions, unless that number is limited for a given node based on the associated constraints 107.

Figure 4A:
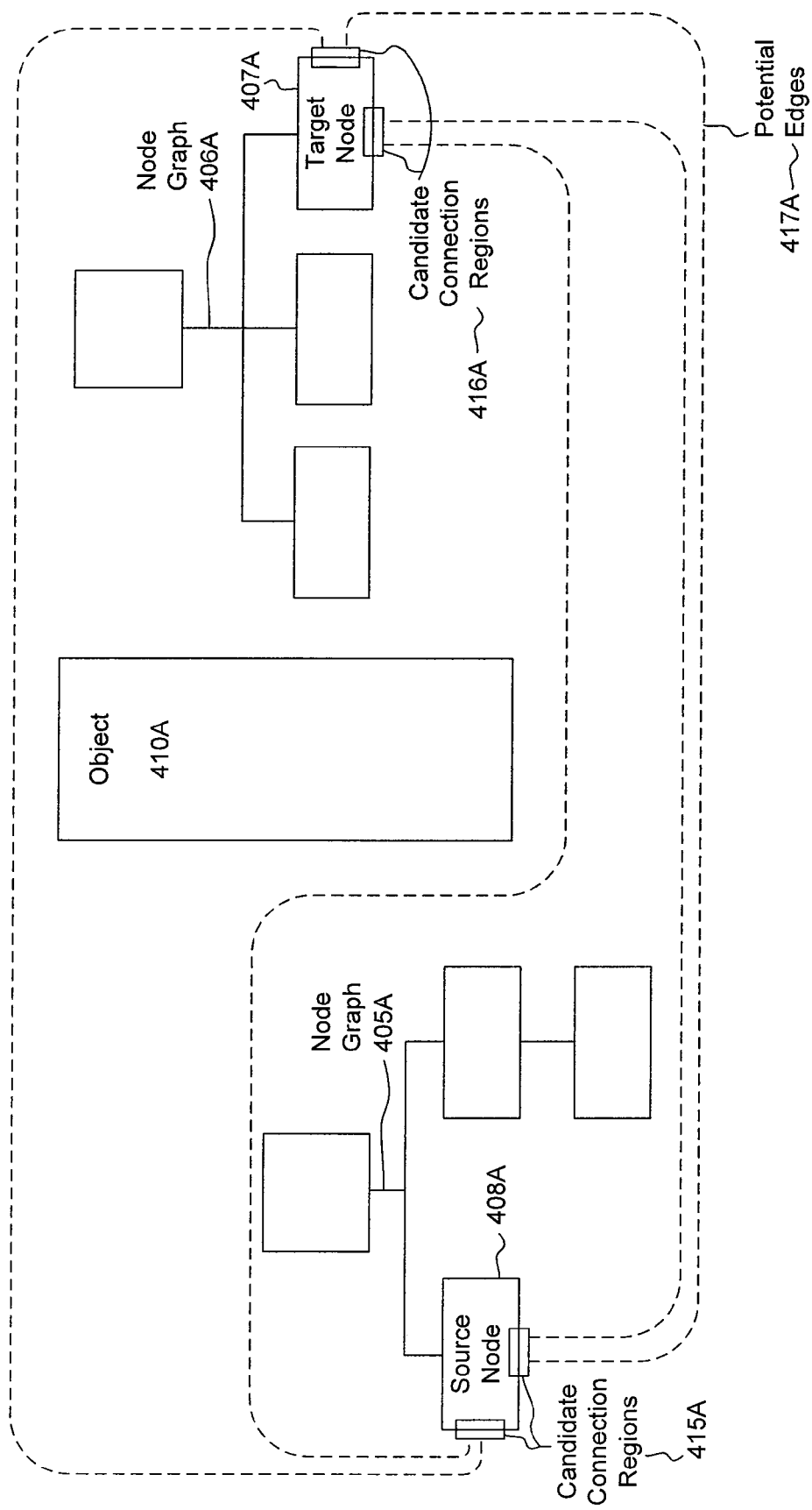
FIGS. 4A & 4B illustrate embodiments in which edges are rerouted between nodes as a node graph is moved.
Figure 4B:
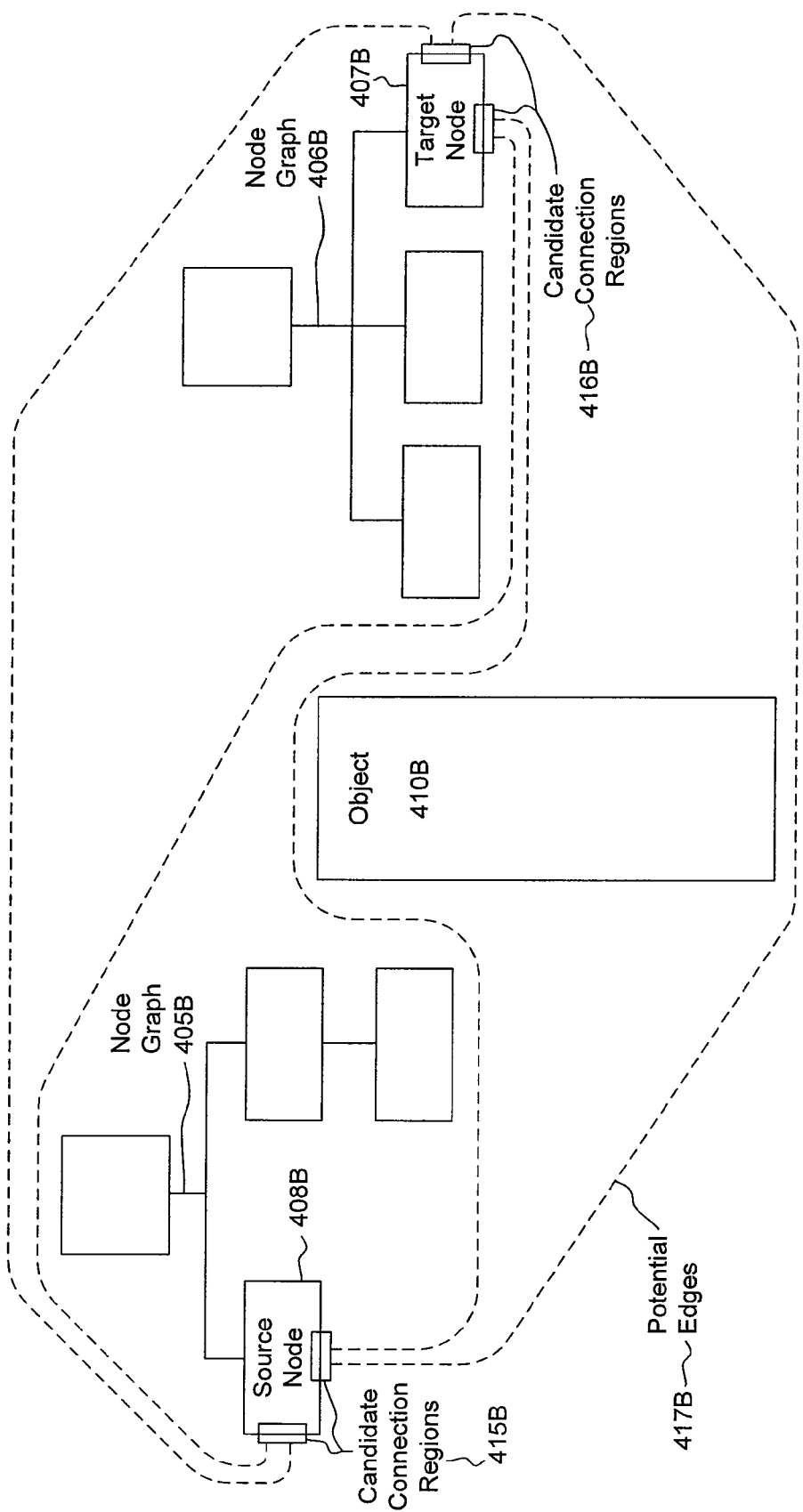

Method 300 also includes an act of determining the optimal route between the source node and the target node based on at least one of the following factors: the number of edges crossing, the shortest path between the nodes and the least number of bends in the edge (act 320). For example, route determining module 115 may determine the optimal route between source node 131 and target node 132 based on at least one of the following factors: the number of edges crossing, the shortest path between the nodes and the least number of bends in the edge. As shown in FIGS. 4A and 4B, avoiding crossing edges, taking the shortest path and avoiding a high number of bends may be complicated by intervening objects such as objects 410A/410B. Moreover, determining the optimal route may be further complicated when the user moves a node or collection of nodes and the routes have to be recalculated in real-time, based on at least one of the above factors.

Method 300 includes an act of routing the edge from the source node to the target node using the determined optimal route (act 330). For example, route determining module may route an edge from source node 131 to the determined connection region using the determined optimal route. It should be noted that a determined optimal route is only optimal for a certain period of time. Once changes have been made to the diagram, a once-optimal route may no longer be such.

Accordingly, computer system 101 continually recalculates each edge's optimal route between two nodes. The edge itself may be lengthened, shortened, moved, bent, or otherwise adjusted to reach the determined connection region. Additionally, as changes are made to the node-link diagram, the determination of which candidate connection region is optimal may also change. Thus, as a node is moved or otherwise manipulated by a user, the edges themselves may be changed as well as the connection regions. Moreover, the user may designate that when moving a node, an edge is to be routed through a defined position (e.g. as provided by a routing hint). Accordingly, edge routing may be structured (or semi-structured) to route through certain defined positions using routing hints provided by a user.

FIGS. 4A and 4B each illustrate two node graphs (405A/405B and 406A/406B) whose source nodes (408A/408B) are connected to target node (407A/407B) via potential edges (417A/417B). Depending on the scenario any of the potential edges shown may be used, or computer system 101 may identify other, better edge routes. The potential edges 417A/417B are shown merely to give an idea of possible edge routings and should not be read as limiting the routing possibilities. As mentioned above, user input 106 may indicate that node graph 405A is to be moved upwards (as is shown in FIG. 4B). As the node graph is moved, possible edge routes are continually calculated between each of source node 408A/408B's candidate connection regions (415A/415B) and target node 407A/407B's candidate connection regions (416A/416B). These edges are wrapped around obstacles such as object 410A/410B and any other objects that intervene between the source and target nodes.

Thus, a user can indicate that the target node is to be moved within the node-link diagram and the computer system 101 will dynamically calculate an updated optimal route based on at least one of the aforementioned aesthetic factors and re-route the edge between the source node and the target node based on the dynamically determined updated optimal route. In some cases, the edge may be dynamically reconnected to a different candidate connection region of the target node based on the dynamically determined updated optimal route. In other cases, the edge may be dynamically reconnected to a different candidate connection region of the source node based on the dynamically determined updated optimal route. And in still other cases, the edge may be dynamically reconnected to a different candidate connection region of both the source node and the target node based on the dynamically determined updated optimal route.

Thus, a computer system may identify various constraints on candidate connection regions and selectively place the connection regions according to an optimal placement determination. Moreover, the computer system may also dynamically select an optimal edge route between two nodes that avoids intervening objects and maintains an aesthetically appealing line. These determinations may be continually updated such that as a user moves a node, the optimal route and the optimal connection region may be selected in real-time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, a computer-implemented method for establishing one or more possible connection regions for connecting an edge to a node, the method comprising:

an act of the computer system identifying a source node that is to be connected to a target node, wherein the target node is connected to the source node using an edge that links a connection region associated with the source node to a candidate connection region of the target node, the candidate connection region defining a range in which edges are connectable to the target node;

an act of identifying one or more candidate connection region constraints that place restrictions on where the candidate connection regions can be positioned on the target node;

an act of determining, based on the identified candidate connection region constraints, the position of each candidate connection region relative to the target node, wherein at least two of the candidate connection regions are disconnected such that an edge's connection to the target node can change between the disconnected connection regions; and an act of visually representing the position of each of the candidate connection regions of the target node.

2. The method of claim 1, wherein the constraints for the candidate connection regions are based on the content type of the target node.

3. The method of claim 1, wherein the constraints for the candidate connection regions are defined by a style associated with the software application implementing the nodes.

4. The method of claim 1, wherein a plurality of edges are connected to a single connection region.

5. The method of claim 4, further comprising spreading out the plurality of edges within the connection region according to a user-defined spacing.

6. The method of claim 1, wherein the connection region comprises a defined area.

7. The method of claim 6, wherein the defined area includes a bounded area.

8. The method of claim 1, further comprising an act of determining the best candidate connection region to connect the edge to for each node in real-time.

9. The method of claim 8, wherein the best candidate connection region for the edge is determined based on at least one of the following factors: the number of edges crossing, the shortest path between the nodes and the least number of bends in the edge.

10. The method of claim 9, wherein the best candidate connection region determination is performed continually in real-time.

11. The method of claim 10, further comprising:

an act of receiving input from a user indicating that a node is to be moved within a node-link diagram; and an act of updating the edge routing for each node as the user moves the node, wherein the updated routing is based on the continually updated best candidate connection region determination.

12. The method of claim 1, further comprising combining two or more edges at the same connection region upon determining that, as a result of the user's input, the best candidate connection region is the same region for both edges.

13. A computer program product for implementing a method for determining an optimal routing path between a source node and a target node, the computer program product comprising one or more tangible computer-readable storage media having stored thereon computer-executable instructions that, when executed by one or more processors of the computing system, cause the computing system to perform the method, the method comprising:

an act of defining one or more candidate connection regions for a source node and for a target node, the connection regions defining a range in which edges are connectable to the target node, wherein the source node is to be linked to the target node using an edge, and wherein the source node and target node are both nodes in a node-link diagram;

an act of identifying one or more candidate connection region constraints that place restrictions on where the candidate connection regions can be positioned on the target node;

an act of determining, based on the identified candidate connection region constraints, the position of each candidate connection region relative to the target node, wherein at least two of the candidate connection regions are disconnected such that an edge's connection to the target node can change between the disconnected connection regions;

an act of determining the optimal route between the source node and the target node based on at least one of the following factors: the number of edges crossing, the shortest path between the nodes and the least number of bends in the edge; and an act of routing the edge from the source node to the target node using the determined optimal route.

14. The computer program product of claim 13, further comprising:

an act of receiving an input from a user indicating that the target node is to be moved within the node-link diagram;

an act of dynamically determining an updated optimal route based on at least one of the factors; and an act of re-routing the edge between the source node and the target node based on the dynamically determined updated optimal route.

15. The computer program product of claim 13, wherein the edge is dynamically reconnected to a different candidate connection region of the target node based on the dynamically determined updated optimal route.

16. The computer program product of claim 13, wherein the edge is dynamically reconnected to a different candidate connection region of the source node based on the dynamically determined updated optimal route.

17. The computer program product of claim 13, wherein the edge is dynamically reconnected to a different candidate connection region of both the source node and the target node based on the dynamically determined updated optimal route.

18. The computer program product of claim 13, further comprising wrapping the edge around any intervening object that is placed between the source node and the target node.

19. The computer program product of claim 13, further comprising determining candidate connection regions for a node that includes an inheritance edge and for a node of an object-oriented design diagram, such that the two are linked at the determined candidate connection regions.

20. A computer system comprising the following:

one or more processors;

system memory;

one or more computer-readable storage media having stored thereon computer-executable instructions that, when executed by the one or more processors, causes the computing system to perform a method for establishing one or more possible connection regions for connecting an edge to a node, the method comprising the following:

an act of identifying a source node that is to be connected to a target node, wherein the target node is connected to the source node using an edge that links a connection region associated with the source node to a candidate connection region of the target node, the candidate connection region defining a range in which edges are connectable to the target node;

an act of identifying one or more candidate connection region constraints that place restrictions on where the candidate connection regions can be positioned on the target node, the constraints for the candidate connection regions being based on the content type of the target node;

an act of determining, based on the identified candidate connection region constraints, the position of each candidate connection region relative to the target node, wherein at least two of the candidate connection regions are disconnected such that an edge's connection to the target node can change between the disconnected connection regions; and an act of visually representing the position of each of the candidate connection regions of the target node.

* * * * *